US007085425B2

(12) United States Patent
Christopoulos et al.

(10) Patent No.: US 7,085,425 B2
(45) Date of Patent: Aug. 1, 2006

(54) EMBEDDED DCT-BASED STILL IMAGE CODING ALGORITHM

(75) Inventors: Charilaos Christopoulos, Sollentuna (SE); David Nister, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 184 days.

(21) Appl. No.: 10/859,234

(22) Filed: Jun. 3, 2004

(65) Prior Publication Data

US 2005/0008231 A1 Jan. 13, 2005

Related U.S. Application Data

(60) Division of application No. 09/534,118, filed on Mar. 23, 2000, now abandoned, which is a continuation of application No. PCT/SE98/01070, filed on Jun. 5, 1998.

(30) Foreign Application Priority Data

Sep. 23, 1997 (SE) .................................... 9703441

(51) Int. Cl.
*G06K 9/36* (2006.01)
(52) U.S. Cl. ........................ 382/243; 382/240; 382/248
(58) Field of Classification Search ................ 382/240, 382/243, 248, 250; 375/240.1, 240.2, 240.08
See application file for complete search history.

(56) References Cited

U.S. PATENT DOCUMENTS

| 4,698,689 A | 10/1987 | Tzou |
| 4,903,317 A | 2/1990 | Nishihara et al. |
| 5,001,561 A | 3/1991 | Haskell et al. |
| 5,196,933 A | 3/1993 | Henot |
| 5,333,212 A | 7/1994 | Ligtenberg |
| 5,339,108 A | 8/1994 | Coleman et al. |
| 5,363,138 A | 11/1994 | Hayashi et al. |
| 5,563,960 A * | 10/1996 | Shapiro ...................... 382/239 |
| 5,757,974 A * | 5/1998 | Impagliazzo et al. ........ 382/248 |
| 5,901,249 A | 5/1999 | Ito et al. |
| 5,991,816 A * | 11/1999 | Percival et al. .............. 382/248 |
| 6,804,405 B1 * | 10/2004 | Christopoulos et al. ...... 382/243 |
| 2002/0126906 A1 | 9/2002 | Christopoulos et al. |

OTHER PUBLICATIONS

Xion et al., "A DCT-based embedded image coder", IEEE Signal Processing Letters, vol. 3 issue: 11, Nov. 1996, pp. 289-290.

(Continued)

*Primary Examiner*—Vikkram Bali
*Assistant Examiner*—Colin LaRose
(74) *Attorney, Agent, or Firm*—Nixon & Vanderhye, P.C.

(57) ABSTRACT

In an embedded DCT-based (EDCT) image coding method, decoded images which give better PSNR over earlier JPEG and DCT-based coders are obtained by a scanning order starting, for each bitplane, from the upper left corner of a DCT block (corresponding to the DC coefficient) and transmitting the coefficients in an order of importance. An embedded bit-stream is produced by the encoder. The decoder can cut the bit-stream at any point and therefore reconstruct an image at a lower bitrate. The quality of the reconstructed image at this lower rate is the same as if the image was coder directly at that rate. Near lossless reconstruction of the image is possible, up to the accuracy of the DCT coefficients. The algorithm is very useful in various applications, like WWW, fast browsing of databases, medical imaging, etc.

12 Claims, 3 Drawing Sheets

OTHER PUBLICATIONS

Nguyen-Phi et al., "DWT image compression using contextual bitplane coding of wavelet coefficients". Acoustics, Speech, and Signal Processing, 1997. ICASSP-97., 1997 IEEE International Conference on, vol. 4, Apr. 21-24, 1997, pp. 2969-2972.

Laurance et al. "Embedded DCT coding with significance masking", Acoustics, Speech, and Signal Processing, 1997. ICASSP 97., 1997 IEEE International Conference on, vol. 4, Apr. 21-24, 1997, pp. 2717-2720.

Atsumi et al. "Lossy/Lossless Region-of-Interest Image Coding Based on Set Partitioning in Hierarachical trees", ISO/IEC JTC 1/SC 29/WG 1 N839. Mar. 23, 1998.

Panagiotidis et al, "Region-of-Interest Based Compression of Magnetic Resonance Imaging Data", Proceedings/IWISP '96, Third International Workshop on Image and Signal Processing on the Theme of advances in Computational Intelligence, Edited by Mertzios et al, Nov. 4-7, 1996, pp. 31-35.

Proceedings of the SPIE Conference on Visual Communications and Image Processing, vol. 2094 Part 2, 1993, A Said et al., "Reversible image compression via multiresolution representation and predictive coding", pp. 664-674.

Signal Processing, vol. 59, No. 2, Jun. 1997, J. Ström et al., "Medical image compression with lossless regions of interest", pp. 155-171.

International Search Report PCT/SE98/01809.

U.S. Appl. No. 09/532,768, filed Mar. 22, 2000 entitled "Lossless Region of Internet Coding".

Heer et al, "A Comparison of Reversible Methods for Data Compression", SPIE vol. 1233 Medical Imaging IV; Image Processing (1990), pp. 354-365.

Viahakis et al. "ROI Approach To Wavelet-Based, Hybrid Compression Of MR Images", Image Processing and Its Applications, 1997, Sixth International Conference, vol. 2, Jul. 14-17, 1997, pp. 833-837.

A New, Fast, and Efficient Image Codec Based on Set Partitioning in Hierarchical Trees, Said et al., IEEE Transactions on Circuits and System for Video Technology, vol. 6, No. 3, Jun. 1996, pp. 243-250.

Lossy/lossless Region-of-Internet Image Coding Based on Set Partitioning in Hierarchical Tress, Atsumi et al., Proceedings of 1998 International Conference on Image Processing ICIP 98, vol. 1, Oct. 4-7, 1998, pp. 87-91.

* cited by examiner

◨ = Estimated bit

⊘ = Used for estimation

◨ = Estimated bit

⊘ = Used for estimation

◨ = Estimated bit

⊘ = Used for estimation

EMBEDDED DCT-BASED STILL IMAGE CODING ALGORITHM

This application is a divisional application of U.S. patent application Ser. No. 09/534,118 filed Mar. 23, 2000 now abandoned which is a continuation of PCT application PCT/SE98/01070 filed Jun. 5, 1998 which claims priority of SE 9703441-7 filed Sep. 23, 1997, the entire content of which is hereby incorporated by reference.

TECHNICAL FIELD

The present invention relates to a coding algorithm for still images and to a device for executing the algorithm. The algorithm is particularly well suited for generating an embedded bit-stream and for coding parts of the image with different quality than the rest of the image.

BACKGROUND OF THE INVENTION AND PRIOR ART

Transform coding has been widely used in many practical image/video compression systems. The basic idea behind using a transformation is to make the task of compressing the image after transformation easier than direct coding in the spatial domain. The Discrete Cosine Transform (DCT) has been used as the transformation in most of the coding standards as JPEG, H261/H.263 and MPEG.

In recent years most of the research activities have shifted from the DCT to the wavelet transform, especially after Shapiro published his work on embedded zerotree wavelet (EZW) image coding, see J. M. Shapiro, "Embedded Image Coding using zerotrees of wavelet coefficients", IEEE Trans. on Signal Processing, Vol. 41, No. 12, pp. 3445–3462, December 1993.

The paper, W. B. Pennebaker, J. L. Mitchell, JPEG Still Image Data Compression Standard, Van Nostrand Reinhold, New York, 1993 describe the state of the art in. DCT-based coding.

In many applications it is desired to obtain an embedded bit-stream. Since an embedded bit-stream contains all lower rates embedded at the beginning of the bit-stream, the bits are ordered from the most important to the less important. Using an embedded code, the encoding simply stops when the target parameter as the bit count is met. In a similar manner, given the embedded bit-stream, the decoder can cease decoding at any point and can produce reconstructions corresponding to all lower-rate encoding.

In order to make the embedded bit-stream optimal, it is desired to transmit first the bits which are most significant for the visual perception of an image. This corresponds to letting the bit-stream have a good compression/quality ratio at low bit rates.

The DCT is orthonormal, which means that it preserves the energy. In other words, with respect to the root mean squared error (RMSE) (or peak signal-to-noise ratio—PSNR) an error in the transformed image of a certain magnitude will produce an error of the same magnitude in the original image.

This means that the coefficients with the largest magnitudes should be transmitted first because they have the largest content of information. This also means that the information can also be ranked according to its binary representation, and the most significant bits should be transmitted first.

After the DCT transformation, most of the energy of the image is concentrated in low frequency coefficients, and the rest of the coefficients have very low values. This means that there are very many zeroes in the most significant bit planes (MSB) of the coefficients. Until the first significant bit (FSB) of a certain coefficient is found, the probability of zero is very high. The task of efficient encoding therefore becomes the task of encoding these zeroes in an efficient way.

In the papers Z. Xiong, O. Guleryuz, M. T. Orchard, A DCT-based embedded image coder, IEEE Signal Processing Letters, Vol. 3, No. 11, pp. 289–290, November 1996, N. K. Laurance, D. M. Monro, Embedded DCT coding with significance masking", Proc.IEEE ICASSP 97 , Vol. IV, pp. 2717–2720, 1997 and J. Li, J. Li, C.-C. Jay Kuo, Layered DCT still image compression, IEEE Trans. On Circuits and Systems for Video Technology, Vol. 7, No. 2, April 1997, pp. 440–442, although DCT is the transform used, the coding of the coefficients is not done in the way that JPEG coding is done. Instead, an embedded bit stream can be produced.

SUMMARY

It is an object of the present invention to provide an algorithm and a device for executing the algorithm, which output an embedded DCT-based (EDCT) image, from which the decoded images give better PSNR over those from JPEG and the DCT-based coders published in the above cited papers.

It is also an object of the invention to provide methods that can be used for encoding Regions of Interest (ROIs) of the image with different quality than the rest of the image, while still keeping the embedded property of the algorithm.

These objects are obtained by a method employing the following basic steps:

Partition the image into rectangular blocks.

Transform each block separately with the DCT. The transformation produces a block of coefficients with the DC coefficient in the upper left corner and higher horizontal and vertical frequency coefficients in the direction of the corresponding block axis. Traditionally the blocks used are 8×8 in size, but here any power of two block size is allowed. The reason to restrict the size to a power of two is that then the DCT can be computed fast.

Quantize and transmit the DCT coefficients in a progressive manner, so that the most important information is transmitted first.

However, in order to make the compression good at every transmission rate, i.e. so that the bit-stream can be cut at any time and still provide an image having a good quality at that compression ratio, an effective scan order needs to be used.

Thus, according to the invention, for each coefficient, the first non-zero bit, starting from the most significant to less significant bits, is called the First significant bit (FSB). The bits of a coefficient prior to the first significant bit will be referred to as the Zero bits (ZBs). The sign information is represented by the Sign bit (SB), while the rest of the bits after the first significant bit are called Raw bits (RBs). Coding is done bitplane by bitplane. In each bitplane, the coding is from the lowest frequency coefficient to the highest frequency.

For every zero bit sent, the length of the uncertainty interval for that coefficient seen by the decoder is divided by two. When the first significant bit is encountered, the sign of the coefficient needs to be sent to maintain an embedded code, as will be described below.

After the sign bit, the RBs have to be transmitted. These contain very little redundancy and there is very little to be gained by trying to encode these with a good prediction.

The receiver can now reverse these steps. The produced bit-stream is embedded and the decoder can therefore cut the bit-stream at any point and generate an image having the same quality as if it was compressed directly at that bitrate.

By using this scan order for such a coding scheme a very good visual quality is obtained for all compression ratios.

BRIEF DESCRIPTION OF THE DRAWINGS

The present invention will now be described in more detail and with reference to the accompanying drawings, in which.

DESCRIPTION OF PREFERRED EMBODIMENTS

Figure 1:
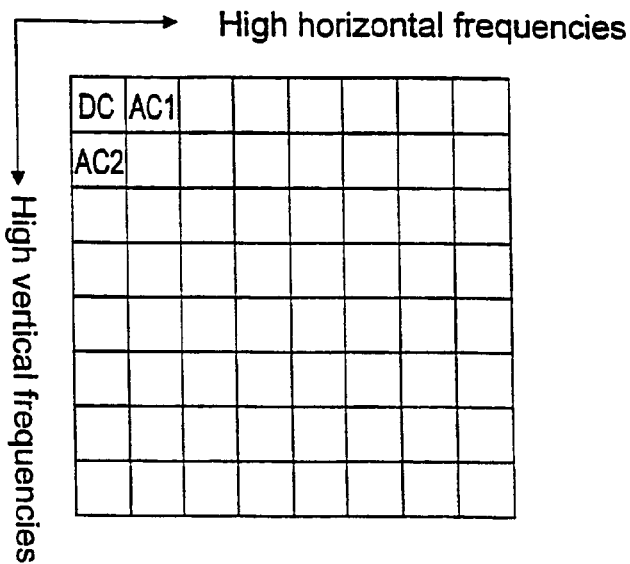
FIG. 1 illustrates how the DCT coefficients are arranged

In FIG. 1 the arrangement of the DCT coefficients in an 8×8 DCT block is illustrated. Thus, in the upper left corner the low frequency coefficients are found and the higher frequency coefficients are found down and to the right.

Figure 2:
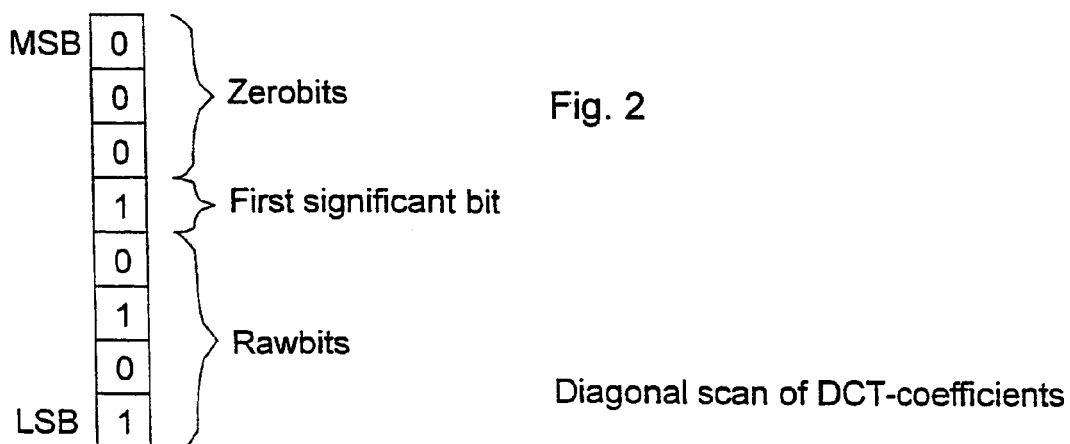
FIG. 2 illustrates the bit order in a pixel
Figure 3:
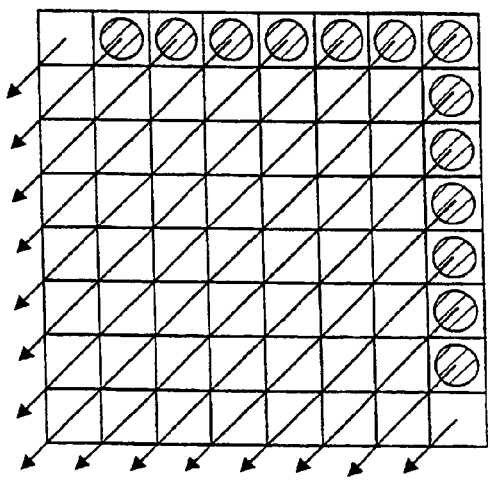
FIG. 3 illustrates the scan order for an embedded coding algorithm

Each coefficient is represented by a number of bits, for example 8 as is illustrated in FIG. 2. In FIG. 2 the first three bits are zero, called zero bits (ZB) the fourth bit is not zero and is called first significant bit (FSB) and the bits having lower significance are called raw bits (RB).

In a preferred embodiment the coding algorithm for a digitized DCT transformed image is as follows:

(1) Find the mean value (DC_mean) of all DC coefficients. Subtract this value from each DC coefficient.

(2) Choose a quantizer that is half the size of the largest magnitude coefficient in the image. Transmit this quantizer.

(3) Send/encode the information of which new coefficients are significant with respect to the current quantizer and also the sign of these coefficients. A coefficient is said to be significant with respect to a quantizer if its magnitude is larger than the current quantizer (in absolute terms) is.

(4) Subtract the current quantizer from the magnitude of the coefficients found to be significant in this bit plane. Replace the significant coefficients magnitude by its magnitude subtracted by the current quantizer. The difference corresponds to keeping only the raw bits.

(5) For all coefficients that have been significant in previous bit planes, send/encode the information of whether the coefficients have a larger or smaller magnitude than the quantizer. Subtract the quantizer from the magnitude of the ones that do and replace those coefficients by the resulted value. This corresponds to transmitting a raw bit.

(6) Divide the current quantizer by two. This corresponds to going down to a less significant bit plane of the coefficients.

(7) Repeat from step (3) until the bit budget is exhausted or some desired quality is reached.

Notice that step 1 above is optional. If it is used, the mean value of the DC coefficients has to be stored/transmitted.

The reconstruction is done as follows:
Set all coefficients to zero.
Receive the first quantizer.
Receive the information about the new significant coefficients.

Reconstruct these as (1.5*current quantizer*the coefficient sign). This is because at this stage it is known that the coefficient's magnitude is between current quantizer and (2*current quantizer). This puts (1.5*current quantizer) in the middle of the uncertainty interval. The addition or subtraction performed at step 5 below will update the coefficients so that they are always in the middle of the uncertainty interval.

For all previously significant coefficients, check if the coefficients have a larger magnitude than the current quantizer. Add the current quantizer/2 to the magnitude of the ones that do and subtract the current quantizer/2 from the magnitude from the ones that do not.

Divide the current quantizer by two.

Repeat from step 3, i.e. reception of new significant coefficients, until the desired quality is reached or no more information exists.

If step (1) had been performed at the encoder, then the decoder has also received the mean value of the DC coefficients and this value is added to the reconstructed DC coefficients.

Furthermore, for updating the coefficients in every bit plane a scan order needs to be defined. In a preferred embodiment one coefficient is updated in all blocks before proceeding to the next coefficient.

Inside a block, the DCT coefficients are scanned in a diagonal order, bit plane by bit plane. After each scanned diagonal, a flag is sent telling if there are any new significant coefficients in the rest of the block. This will be referred to as the block cut_off. The block cut_off is used because in the first bit planes there are so many zeroes that in practice an explicit symbol performs better than trying to code all the zeroes with a good prediction. The block cut off symbols only concern the new significant coefficients.

Notice that instead of having a cut_off flag for each diagonal, run length coding methods could be used. For example, if a coefficient is significant, a number could be used to denote the position of the next significant coefficient in the block.

As explained above a sign bit has already been sent for the previously significant coefficients. The uncertainty interval is therefore double as big for the coefficients not yet significant and these should be considered first in the new scan. Therefore, during each bitplane, first the significance identification is encoded and then the refinement quantization (steps 3 and 5 of the encoding process).

Figure 4:
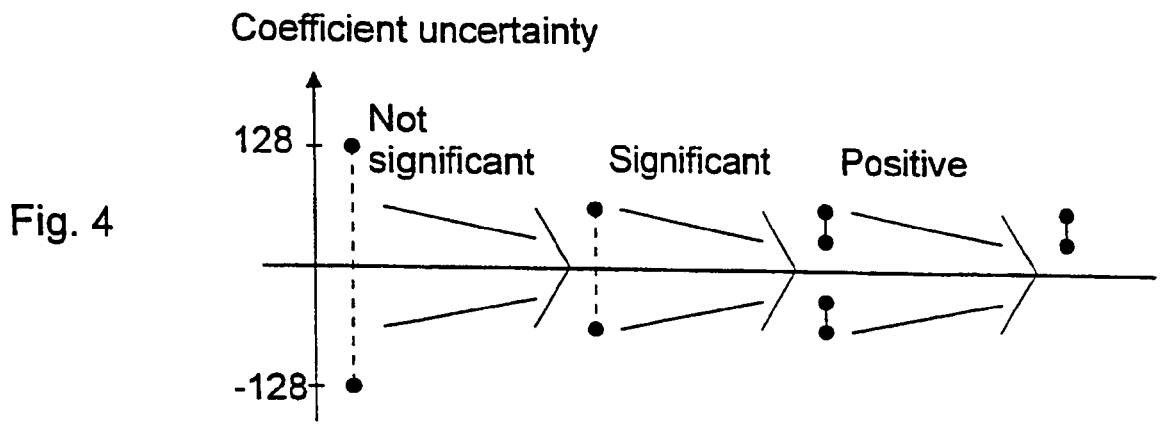
FIG. 4 illustrates the sending of a sign bit

In FIG. 4 the reason for sending a sign bit after encountering the first significant bit is illustrated. Thus, after having sent the sign bit the sign of the coefficient is determined and the resulting coefficient is no longer ambiguous.

During each bit plane, the scanning of the coefficients is preferably done in the following manner: first all DC coefficients, then all AC coefficients with the same index, in a diagonal order starting from the upper left corner and ending in the lower right corner of a DCT block of the image, i.e. DC, AC1, AC2, etc. . . .

The zig-zag scanning used in JPEG could also be used without affecting the property of embedded coding of the algorithm.

An embedded bit-stream is in this manner produced by the encoder. The decoder can cut the bit-stream at any point and therefore reconstruct an image at a lower bitrate. The quality of the reconstructed image at this lower rate would be the same as if the image was coded directly at that rate. Near lossless and lossless reconstruction of the image is possible.

Figure 8:
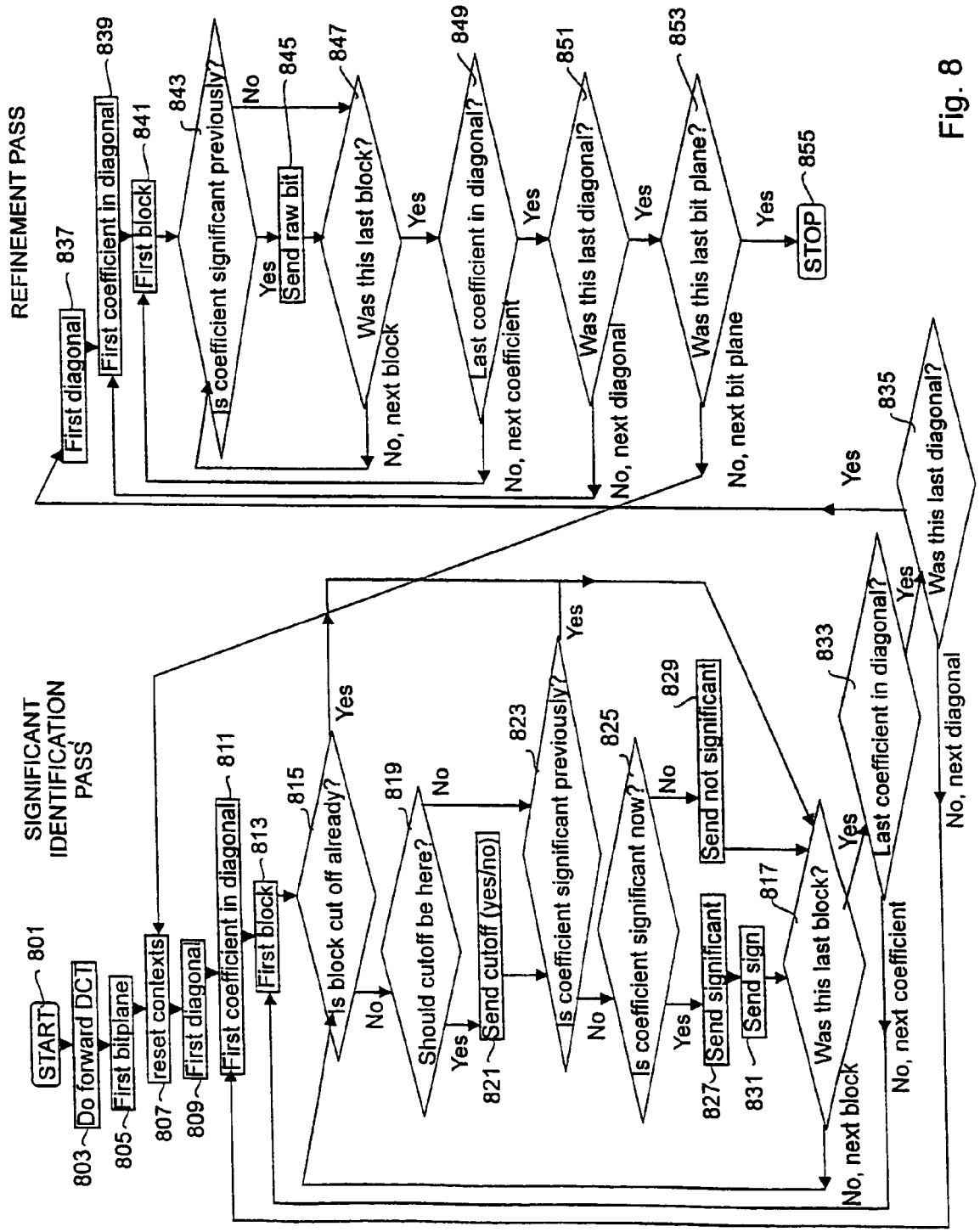
FIG. 8 is a flow chart illustrating the coding procedure

The scan order used is illustrated in FIG. 8. Thus, first in a step 801 the procedure starts. Next in a step 803 a DCT transformation is executed. Thereupon the first bit-plane of the DCT coefficients is extracted in a step 805. The contexts are then reset in a step 807.

Next, the first diagonal is extracted in a step 809 and the first coefficient is extracted in a step 811. The first block is then extracted in a step 813. Then in a step 815 it is checked if the block is already cut. If this is the case the procedure proceeds to a step 817 and else to a step 819.

In the step 819 it is checked if the block should be cut off at this movement. If this is the case the procedure proceeds to a step 821 in which a block cut off symbol is transmitted, else the procedure proceeds to a step 823.

In the step 823 it is checked if the coefficient is previously significant, i.e. it is checked if this is the first significant bit (FSB). If the coefficient is previously significant the procedure proceeds to the step 817 and else to a step 825.

In the step 825 it is checked if the coefficient is significant now. If this is the case the procedure proceeds to a step 827 and else to a step 829.

In the step 829 data is sent containing information that the coefficient is not significant and from the step 829 the procedure proceeds to the step 817.

In the step 827 data is sent containing information that the coefficient is significant and from the step 829 the procedure proceeds to the step 817 via a step 831 in which the sign is sent.

In the step 817 it is checked if this is the last block of the DCT image. If this is the case the procedure proceeds to a step 833 and else the procedure returns to the step 815 and repeats the process for the next block.

In the step 833 it is checked is the current coefficient is the last coefficient in the diagonal. If this is the case the procedure proceeds to a step 835 and else it returns to the step 813 for the next coefficient.

In the step 835 it is checked is this diagonal is the last diagonal. If this is the case the procedure proceeds to a step 837 and else it returns to the step 811 for the next diagonal.

In the step 837 the refinement starts. Thus, in the step 837 the first diagonal is extracted. Then in a step 839 the first coefficient in the first diagonal is extracted. Next in a step 841 the first block is contemplated. Thereupon in a step 843 it is checked if the current coefficient is previously significant. If this is not the case the procedure proceeds to a step 847 and else the procedure proceeds to the step 847 via a step 845, in which the raw bits are sent.

In the step 847 it is checked if the current block is the last block. If this is the case the procedure proceeds to a step 849 and else the procedure returns to the step 843 for the next block.

In the step 849 it is checked if the current coefficient is the last in the current diagonal. If this is the case the procedure proceeds to a step 851 and else the procedure returns to the step 841 for the next coefficient.

In the step 851 it is checked if the current diagonal is the last diagonal. If this is the case the procedure proceeds to a step 853 and else the procedure returns to the step 839 for the next diagonal.

In the step 853 it is checked if the current bit plane is the last bit plane. If this is the case the procedure proceeds to a step 855, in which the procedure is terminated, and else the procedure returns to the 807 for the next bit plane.

To further clarify the scan order and the algorithm in general, pseudo code for the encoder is presented below:

```
Code_image {
  Do forward DCT;
  for(all bitplanes)
    {
      reset_contexts;
      /*significance identification pass*/
      for(all_diagonals)
    {
      for(all_coefficients_in_diagonal)
        {
          for(all_blocks_not_cut_off_already)
            {
              if(cut_off_position) send cut_off_symbol;
              if(coefficient_not_previously_significant)
                {
                  if (significant)
                    {
                      send(significant);
                      send(sign);
                    }
                  else send(not significant);
                }
            }
        }
    }
  /*refinement pass*/
  for(all_diagonals)
    {
      for(all_coefficients_in_diagonal)
        {
          for(all_blocks)
            {
              if(coefficient__significant_in_any_previous_
              bitplane)
                send(raw_bit);
            }
        }
    }
  }
}
```

After the correct scan order has been chosen, it remains to code the scan in an efficient way. The issue is mainly how to encode the mask of the new significant coefficients. Many methods can be used. e.g. Zero tree coding, run length encoding and address switching.

In a preferred embodiment a context-based arithmetic coding is used. An arithmetic coder implemented according to the guidelines provided by Witten et al and described in, I. H. Witten, R. M. Neal, and J. G. Cleary, "Arithmetic coding for data compression", Communications of the ACM, Vol. 30, No. 6, pp. 520–540, June 1987 can then be used.

The adaptive probability estimation can be expanded and customized for bit plane coding as described below.

When using this method, all that needs to be estimated for each symbol, is the probability of that symbol being zero, since the symbol alphabet used is binary. To do this a context coding method is used.

Context coding has also been used to code bilevel images in standards such as JBIG and also in wavelet encoders as described in, K. Nguyen-Phi and H. Weinrichter, DWT image compression using Contextual bitplane coding of wavelet coefficients, Proc. ICASSP 97, pp. 2969–2971, 1997.

Without contexts, or with only one context, the probability of a zero would be estimated as the number of zeroes seen so far, divided by the total number of symbols coded. Using contexts, a number of surrounding or preceding symbols are used to choose one out of several contexts. The contexts are chosen so that the symbols coded in the same context are expected to have similar statistics. In this case every context holds the number of zeroes and the total number of symbols seen in this context.

The probability of zero is then estimated as the number of zeroes divided by the total number of symbols. After the symbol is coded the context is updated.

Several ways of choosing the context for the symbols can be used. Also different ways of updating the contexts can be used. In a preferred embodiment the contexts is restarted for every new bit plane. This is due to the fact that different bit planes have different statistics and that statistics inside a bit plane is stationary enough.

The bits used for the estimation of a symbol that is to be encoded are put together and considered to form an integer number. This number is used to index a context. The indexed context holds all previous statistics seen when the bits used for the estimation had this exact configuration.

In the following, the information of whether a coefficient is significant or not, is considered to be a bit plane of its own, called the significance plane. This bit plane is '1' if the coefficient in question has been found to be significant in the current bit plane or any previous bitplane.

For the raw bits of all coefficients only one context can be used. This is only slightly better than sending the bits raw without entropy coding. This is also true for the AC coefficients sign bits and these were also encoded using only one context. It should be noted that it is possible to send them as raw bits and not encode them with arithmetic coding. This might reduce the performance but will increase the execution speed of the algorithm.

Figure 5:
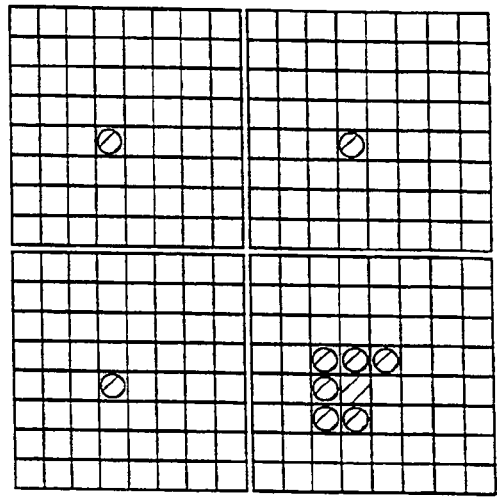
FIG. 5 illustrates the context for AC coefficient zero bits
Figure 6:
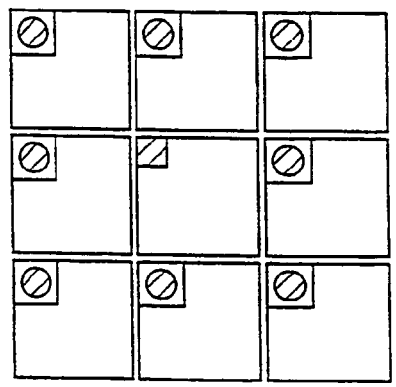
FIG. 6 illustrates the context for DC coefficient zero bits

The DC sign bit is coded in a context chosen by adding together the number of DC neighbours that are marked in the significance plane and have a positive sign as is illustrated in FIG. 6. The AC coefficients zero bits (and significant bit) can be coded taking into account 6 neighbouring coefficients in the block and the same coefficient in three neighbouring blocks as is illustrated in FIG. 5. The information in the significance plane for these coefficients, is used for the context.

For the DC coefficient zero bits the context is chosen using the DC coefficients in all the neighbouring blocks. Also in this case the only thing considered is the significance plane.

Figure 7:
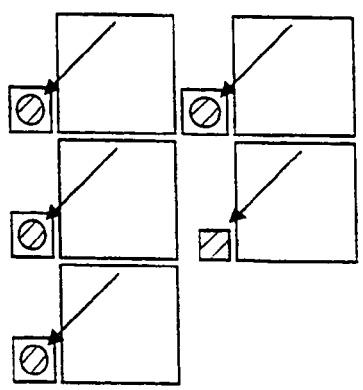
FIG. 7 illustrates the context for cut_off signals

The block cut_off is coded in the context of the cut_off symbols in 4 neighbouring blocks as is illustrated by FIG. 7. The diagonal number is also taken into account. This is done by using the four bits of the related cut off symbols and the diagonal, which is a 4 bit number and compose them into an 8 bit integer that indexes the context.

The results can be improved, for example by using some suitable post processing algorithm.

The computational complexity and memory requirements of the algorithm described herein are mainly due to the DCT computation and the use of arithmetic coding.

Since the algorithm is block-based, parallel implementation is possible. In particular, the parallel implementation of the transformation stage is possible. Assume that P processors are available, to process an N×M image which is divided in 8×8 blocks, then each processor can do the DCT transformation in the blocks of the (N/P)×M part of the image. Furthermore, bitplanes can be processed independently and parallel. This is due to the fact that the contexts are restarted in each bitplane and that no grouping of coefficients is performed. All that needs to be known in a specific bitplane is which coefficients are significant previous of that bitplane. This information can be derived (also in parallel) from the DCT coefficients immediately after the transformation. Notice that the sign bit needs to be coded in a simple fashion.

Notice that the algorithm is very well suited for progressive image transmission. During progressive image transmission, it is desired to provide lossless compression at the last stage of the transmission. Without any restriction on the accuracy of DCT, near lossless reconstruction can be achieved. Lossless reconstruction can be achieved by a lossy plus lossless residual encoding method in which case the proposed algorithm is used for achieving the lossy part of the compression. Notice that this approach requires an integer inverse DCT to ensure portability of software and hardware.

In certain applications, particular regions of an image need to be coded with better quality compared to the other parts. The algorithm can be used for coding Regions of Interest (ROI) with different quality compared to the rest of the image. For example, if a ROI is to be coded at 1 bit per pixel (bpp) and the rest of the image at 0.5 bpp, then during a progressive image transmission, the image could be transmitted until the 0.5 bpp is achieved and then information to reconstruct the ROI at an additional 0.5 bpp could be transmitted (this is only a possible scenario). The ROI can also be coded lossless with the method described in previous paragraph. Notice that the ROI might have arbitrary size. In this case the methods used in MPEG 4 can be applied (block padding or Shape Adaptive DCT). Some modifications to the algorithm will however be required to make it work with arbitrary ROI's. Various schemes for progressive coding with ROIs are described below. Notice that for simplification purposes it is assumed that the ROI shape is a union of rectangles where the dimensions of the rectangles are the ones used for DCT coding (i.e. 8×8 pixels in most applications using JPEG).

Assuming that the bitrate for the background is x bits/pixel (bpp) and for the ROI is y bpp (y>x). Different schemes can be used to achieve progressive transmission of the image where the background is coded at x bpp and the ROI (or more ROI's) at y bpp (the bitrate for different ROI's can be different)

Below, three different schemes for obtaining such different bitrates are outlined.

In a first scheme the background (BG) and the region of interest (ROI) are coded separately. Such a scheme might result in some problems for progressive transmission, since the BG and the ROI are coded separately, there must be a way to pack the 2 different bitstreams in one so that to achieve progressive transmission of the whole image. Alternatively, the progressive transmission will result in BG or ROI send first and then the other (ROI or BG) send last. This means that the receiver cannot get an idea of what the whole image is at an early stage of the transmission.

Furthermore, correlation between neighbouring blocks in BG and ROI is not exploited, since they are coded separately. This will reduce the compression performance. The method is however good for parallel processing.

In a second scheme the ROI coefficients are shifted or multiplied by a certain number. This method will result in that the ROI coefficients are found significant at the early stages of the transmission and therefore to be coded first, as compared to the BG. The more the ROI coefficients are shifted, the earlier the ROI coefficients will be found significant. Therefore, it is possible to control the speed reconstruction of the ROI. The decoder needs to know the ROI shape and location as well as the shifting factor used for the ROI coefficients. This information is stored at the header information of the bitstream and the decoder can find it when receiving the bitstream. Notice that the number of ROIs can be arbitrary and the shifting (multiplying) factors of the ROI coefficients can be different for different ROIs. In this case, it is possible to control the ROI speed and importance.

Notice that if the coefficients are shifted so much that the smallest ROI coefficient is larger than the largest BG coefficient, then all ROI coefficients will be coded first. This will make the ROI to be reconstructed completely first (even up to lossless as will be described below). Also in this case the ROI shape is not needed to be transmitted. What needs to be transmitted is the shifting factor and a signal to the decoder telling that that the coefficients that have been received are ROI coefficients (alternatively, at the beginning of the header, the number of bytes that correspond to the ROI coefficients can be added so that the decoder knows when to stop decoding ROI coefficients). In this manner, there is no need to transmit the shape of the ROI, since the decoder can find it. This might be important when the shape information is to occupy significant amount of bits (which is the case for arbitrary shaped regions). The saved bits can be used for better coding the ROI or the background. When the ROI bitrate is achieved, the decoder will know what will be received for the background.

Notice that the above scheme is not only applicable in DCT-based coders. Wavelet based coders can also use a similar scheme in order to avoid transmitting the shape information of the ROI's. The scheme can be used for example in Nister D., Christopoulos C. A., "Progressive lossy to lossless coding with a Region of Interest using the Two-Ten integer wavelet", ISO/IEC JTC1/SC29/WG1 N744, Geneva, Switzerland, 23–27 Mar. 1998.

It is also to be noted that this way of transmitting the shape of the ROI can be employed for any transmission scheme transmitting bitplanes in an order of decreasing significance. The only requirement is that the ROI coefficients are shifted with a factor large enough for them to be transmitted before any coefficient of the background. The method will work both for transformed images, e.g. DCT or wavelet transformed, as well as for ordinary bit plane coded images. In order for the receiver to know when the ROI coefficients information on when the last ROI coefficient has been transmitted must be transmitted to the receiver. This can be carried out in a number of different ways. For example, a signal can be transmitted, a bit plane consisting of only zero-valued coefficients, or a header in the beginning of the transmission indicating the number of bits used for the ROI coefficients.

Thus, only ROI is reconstructed at the early stages of the transmission. This makes it difficult for the receiver to know what the rest of the image looks like. This method is therefore good for speed reconstruction of the ROI. However, it avoids exploiting correlation between neighbouring blocks in BG and ROI at the early stages.

According to a third scheme all of the image is coded until the background bitrate (or desired quality) is achieved and then only the ROI is continued to be coded. The complexity of such a scheme remains similar to the one of the system described herein. Thus, there is no dynamic range increase, correlation between neighbouring blocks is exploited (at least until the BG rate is achieved). Furthermore it is possible that after the switch rate (from BG rate to improving the ROI) the remaining bits of the DCT coefficients in ROI will be raw bits. This means that there is little to gain by exploiting the correlation between these bits and then they can be coded even without an entropy coder.

Also, when using such a scheme a signal to the receiver needs to be sent when the BG rate is obtained, and that the ROI now is to be improved only. The decoder also needs to know the ROI shape. This method thus results in slower ROI reconstruction compared to the second scheme, but in all cases the receiver has an idea of the whole image.

The receiver can change the ROI location during the transmitting stage. When the receives gets an image in a progressive transmission manner, it can specify a particular ROI that he wants to see fast and/or with better quality than the rest of the image. The location and shape of the ROI is send to the transmitter. If the transmitter has the image in compressed form, it does a variable length decoding (arithmetic decoding in our scheme) in order to find out the coefficients that correspond to the ROI. Then the transmitted uses one of the schemes described above. Notice that the transmitter needs to arithmetic encode the info again, but will not use the bitplanes that were already transmitted to the receiver. Also, the transmitter does not need to reconstruct completely the image (inverse DCT is not needed). If the transmitter has the original image also then he can use the scheme described above (do DCT first) to encode the non-transmitted bitplanes to satisfy the receiver request.

Notice that the schemes described above can be combined also, so that speed reconstruction of the ROI can be achieved at the early stages together with good quality background.

Finally it is to be noted that the algorithm as described herein is assumed to compress the components independently. With appropriate interleaving, an embedded bitstream for the colour image can be produced.

The algorithm is based on DCT, which has been used in all still image and video coding standards. By appropriate quantization and the use of a context based arithmetic coding, an embedded DCT-based (EDCT) still image coding algorithm is achieved. This property is very useful in WWW applications and fast browsing of data bases.

Due to the fact that the algorithm is based on DCT, minimal modifications have to be made to the current JPEG architecture. Selective refinement, tiling, hierarchical coding and all modes of operations of the current JPEG are supported without introducing new types of artifacts.

Notice that other algorithms could be used instead of the DCT, as the Hadamard transform of the Fourier Transform. In addition, integer implementations of the DCT could be used. In this case the opportunity of lossless coding is achieved, and therefore progressive transmission from lossy to lossless can be achieved with the proposed scheme. As an example, if the DCT transform described by Ohta Mutsumi, "Lossless transform coding system for digital signals", U.S. Pat. No. 5,703,799, Dec. 30, 1997, or if the algorithm of W. K. Cham and Y. T. Chan, "An Order-16 Integer Cosine Transform", Signal Processing, Vol. 39, No. 5, May 1991, pages 1205–1208 then an algorithm that can be used for both lossy and lossless coding is obtained using the methods described in our invention. Also, the possibility of obtaining the lossless ROI and lossy BG is achieved, in a fully progressive way by maintaining the embedded property of the algorithm.

The methods described above can be used for 3D coding or also video coding. In 3D coding, a fully embedded 3D coder can be achieved, where certain ROI's are coded with better quality than the rest of the image. This is particular useful in medical and remote sensing applications. In video coding, an embedded video coder can be designed. The EDCT can be used for coding both intra and inter macroblocks (for example in H.261, H.263 and MPEG video coding standards). Notice that the EDCT can also be used for the encoding of the motion vectors.

The invention claimed is:

1. A method of transmitting a codestream comprising an image, the image comprising an arbitrarily shaped region of interest (ROI), the method comprising:
    transforming the image into the frequency domain and obtaining transformed coefficients;
    dividing the transformed coefficients into ROI coefficients and background coefficients;
    scaling the ROI coefficients in accordance with a number of bitplanes so that the smallest ROI coefficients is greater than the greatest background coefficient;
    including information about the number of bitplanes used for scaling the ROI coefficients in a header in the codestream.

2. A method according to claim 1, further comprising sending the image bitplane by bitplane in a decreasing bitplane order.

3. A method according to claim 1, further comprising entropy coding the bitplanes using an arithmetic coder before the bitplanes are sent.

4. A method according to claim 1, wherein the transforming into the image domain comprises using one of the following transforms: wavelet transform, discrete cosine transform, fourier transform and hadamard transform.

5. A method according to claim 1, wherein there are plural regions of interest (ROI), and the method further comprises shifting or multiplying coefficients of different ones of the plural regions of interest by different factors.

6. A method according to any of claims 1, further comprising transmitting a signal that indicates that transmission of ROI coefficients has ended.

7. A device for transmitting a codestream comprising an image, the image comprising an arbitrarily shaped region of interest (ROI), the method comprising:
    means for transforming the image into the frequency domain and obtaining transformed coefficients;
    means for dividing the transformed coefficients into ROI coefficients and background coefficients;
    means for scaling the ROI coefficients in accordance with a number of bitplanes so that the smallest ROI coefficients is greater than the greatest background coefficient;
    means for including information about the number of bitplanes used for scaling the ROI coefficients in a header in the codestream.

8. A device according to claim 7, further comprising means for sending the image bitplane by bitplane in decreasing bitplane order.

9. A device according to claim 7, further comprising means for entropy coding the bitplanes using an arithmetic coder before the bitplanes are sent.

10. A device according to claim 7, wherein the means for transforming into the image domain comprises using one of the following transforms: wavelet transform, discrete cosine transform, fourier transform and hadamard transform.

11. A device according to claim 7, wherein there are plural regions of interest (ROI), and the device further comprises means shifting or multiplying coefficients of different ones of the plural regions of interest by different factors.

12. A device according to claim 7, further comprising means for transmitting a signal that indicates that transmission of ROI coefficients has ended.

* * * * *